United States Patent
Mallette

(10) Patent No.: US 10,889,380 B2
(45) Date of Patent: Jan. 12, 2021

(54) SEAT MAZE ASSEMBLIES FOR AIRCRAFT

(71) Applicant: Gulfstream Aerospace Corporation, Savannah, GA (US)

(72) Inventor: Jeremiah Mallette, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 392 days.

(21) Appl. No.: 15/650,716

(22) Filed: Jul. 14, 2017

(65) Prior Publication Data

US 2019/0016463 A1    Jan. 17, 2019

(51) Int. Cl.
*B64D 11/06* (2006.01)
*A47C 3/18* (2006.01)
*B60N 2/14* (2006.01)

(52) U.S. Cl.
CPC ...... *B64D 11/0696* (2013.01); *B64D 11/0639* (2014.12); *B64D 11/0648* (2014.12); *A47C 3/18* (2013.01); *B60N 2/14* (2013.01)

(58) Field of Classification Search
CPC .............. B64D 11/0639; B64D 11/064; B64D 11/0648; B64D 11/0696; A47C 3/18; B60N 2/14
See application file for complete search history.

(56) References Cited

U.S. PATENT DOCUMENTS

| | | | | |
|---|---|---|---|---|
| 4,625,934 A | * | 12/1986 | Ryan | B64D 11/06 244/122 R |
| 4,674,713 A | * | 6/1987 | Ryan | B64D 11/06 244/118.6 |
| 4,844,543 A | * | 7/1989 | Ochiai | A47C 3/18 297/344.26 |
| 6,691,970 B1 | | 2/2004 | Sutton, Sr. | |
| 2007/0228215 A1 | * | 10/2007 | Hudson | B64D 9/003 244/118.1 |
| 2007/0232101 A1 | * | 10/2007 | Hudson | B64D 11/0696 439/157 |
| 2007/0253762 A1 | * | 11/2007 | Hudson | B64D 11/0696 403/83 |
| 2011/0133030 A1 | * | 6/2011 | Kennedy | B64D 11/06 244/118.5 |

(Continued)

FOREIGN PATENT DOCUMENTS

DE    29907041 U1    7/1999
DE    102006029206 A1    1/2008
(Continued)

*Primary Examiner* — Theodore V Adamos
(74) *Attorney, Agent, or Firm* — LKGobal | Lorenz & Kopf, LLP

(57) ABSTRACT

Seat assemblies and aircraft interiors are provided. An aircraft interior includes a floor, a seat base fixed to the floor, a seat frame, a seat body, an obstacle, and a seat maze. The seat frame is selectively fixed to the seat base and includes a frame rail circumscribing the seat base to define a bounding area in which the seat base may translate relative to the seat frame. The seat body is mounted on the seat frame and includes an arm portion. The obstacle is proximate the arm portion of the seat body. The seat maze is configured to guide the seat frame around a clearance area within the bounding area to maintain a predetermined clearance between the arm portion and the obstacle.

9 Claims, 4 Drawing Sheets

(56) References Cited

U.S. PATENT DOCUMENTS

| | | | | |
|---|---|---|---|---|
| 2015/0008709 A1* | 1/2015 | Erhel | ................. | B64D 11/0636 |
| | | | | 297/217.2 |
| 2015/0036060 A1* | 2/2015 | Yaghoubi | ................. | B60N 2/01 |
| | | | | 348/837 |
| 2016/0114893 A1* | 4/2016 | Drew | ................... | B64D 11/064 |
| | | | | 248/188.3 |
| 2016/0244170 A1* | 8/2016 | Marini | ............... | B64D 11/0643 |
| 2017/0267355 A1* | 9/2017 | Porter | ................ | B64D 11/0639 |
| 2017/0275003 A1* | 9/2017 | Erhel | ....................... | B60N 2/06 |

FOREIGN PATENT DOCUMENTS

| | | |
|---|---|---|
| DE | 102014000522 A1 | 7/2015 |
| EP | 1900566 A2 | 3/2008 |
| WO | 2006041570 A1 | 4/2006 |
| WO | 2013095987 A1 | 6/2013 |
| WO | 2016049356 A1 | 3/2016 |

\* cited by examiner

SEAT MAZE ASSEMBLIES FOR AIRCRAFT

TECHNICAL FIELD

The technical field relates generally to aircraft and seat maze assemblies for aircraft, and more particularly relates to aircraft and seat maze assemblies that define a portion of a free motion plane that the seat may not move into.

BACKGROUND

A conventional passenger aircraft includes a fuselage, a cabin interior within the fuselage, and a floor that defines a bottom of the cabin interior and that is supported by the fuselage. A seat base is typically secured to the floor and a seat frame is selectively secured to the seat base. When released from engagement with the seat base, the seat frame may move freely within a portion of a movement plane in which the seat base is located within the seat frame. Such free movement, however, may be undesirable when free movement of the seat frame may allow a seat occupant's hand to be pinched between the seat and another object, such as a side ledge or table within the aircraft interior.

As such, it is desirable to provide improved aircraft and systems for limiting portions of the free movement area of the seat. In addition, other desirable features and characteristics will become apparent from the subsequent summary and detailed description, and the appended claims, taken in conjunction with the accompanying drawings and this background.

SUMMARY OF EMBODIMENTS

Various non-limiting embodiments of aircraft, seat assemblies and aircraft interiors are disclosed herein.

In a first non-limiting embodiment, a seat assembly includes a seat base, a seat frame, and a seat maze. The seat base is configured to be fixed to a floor. The seat frame is selectively fixed to the seat base and includes a frame rail circumscribing the seat base to define a bounding area in which the seat base may translate relative to the seat frame. The seat maze is configured to extend a perimeter of the seat base to define a clearance area and to guide movement of the seat frame around the clearance area.

In a second non-limiting embodiment, an aircraft interior includes, but is not limited to, a floor, a seat base fixed to the floor, a seat frame, a seat body, an obstacle, and a seat maze. The seat frame is selectively fixed to the seat base and includes a frame rail circumscribing the seat base to define a bounding area in which the seat base may translate relative to the seat frame. The seat body is mounted on the seat frame and includes an arm portion. The obstacle is proximate the arm portion of the seat body. The seat maze is configured to guide the seat frame around a clearance area within the bounding area to maintain a predetermined clearance between the arm portion and the obstacle.

BRIEF DESCRIPTION OF THE DRAWINGS

Advantages of the present invention will be readily appreciated, as the same becomes better understood by reference to the following detailed description when considered in connection with the accompanying drawings wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Various non-limiting embodiments of aircraft seat assemblies and aircraft interiors are disclosed herein. The embodiments include various configurations of a seat tracking maze that limits movement of a seat frame in a portion of a free movement area to maintain a clearance between the seat and an obstacle near the seat. A greater understanding of the seat assemblies and aircraft interiors may be obtained through a review of the illustrations accompanying this application together with a review of the detailed description that follows.

Figure 1A:
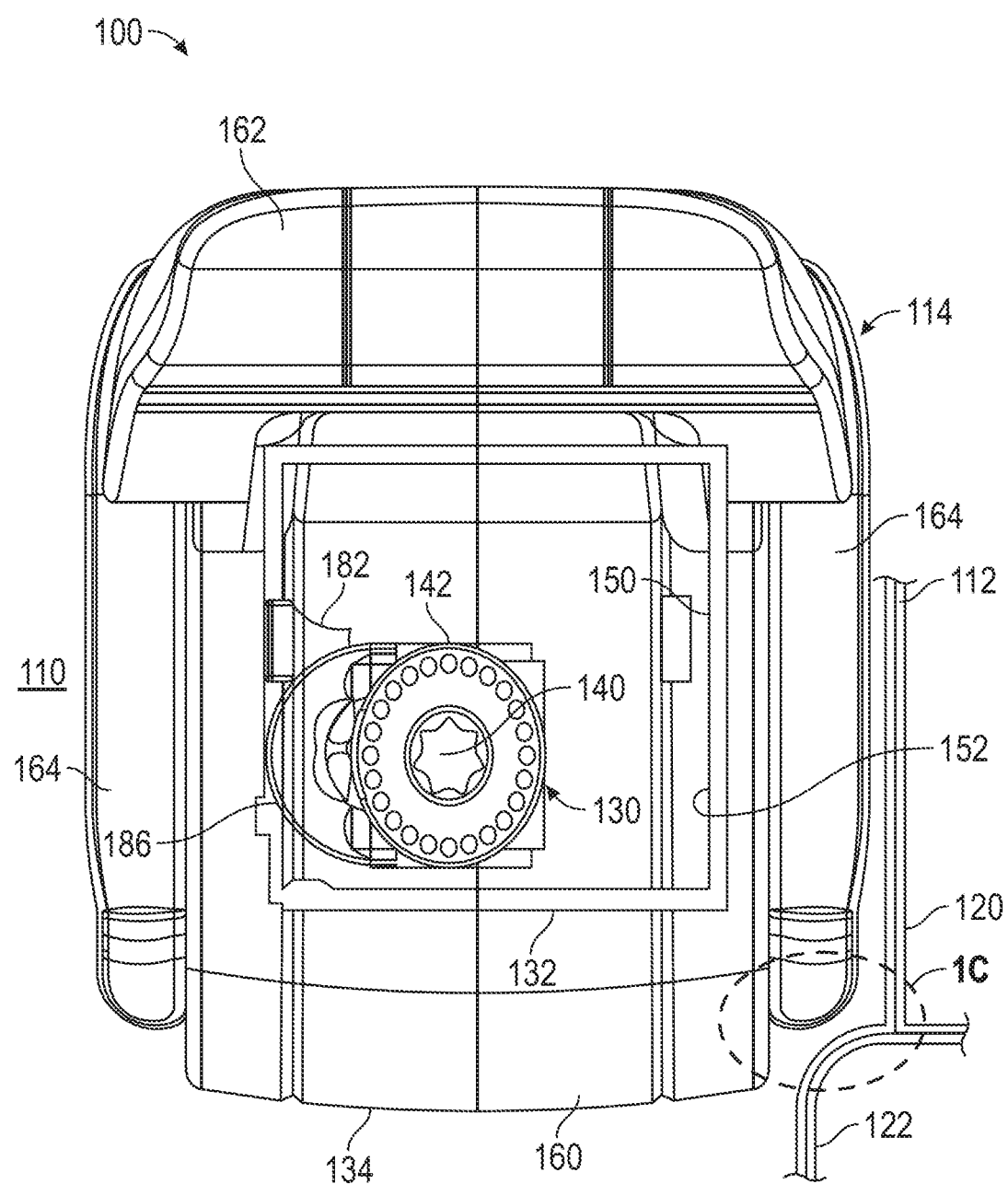
FIGS. 1A and 1B are top views illustrating a non-limiting embodiment of an aircraft interior in accordance with teachings of the present disclosure.
Figure 1B:
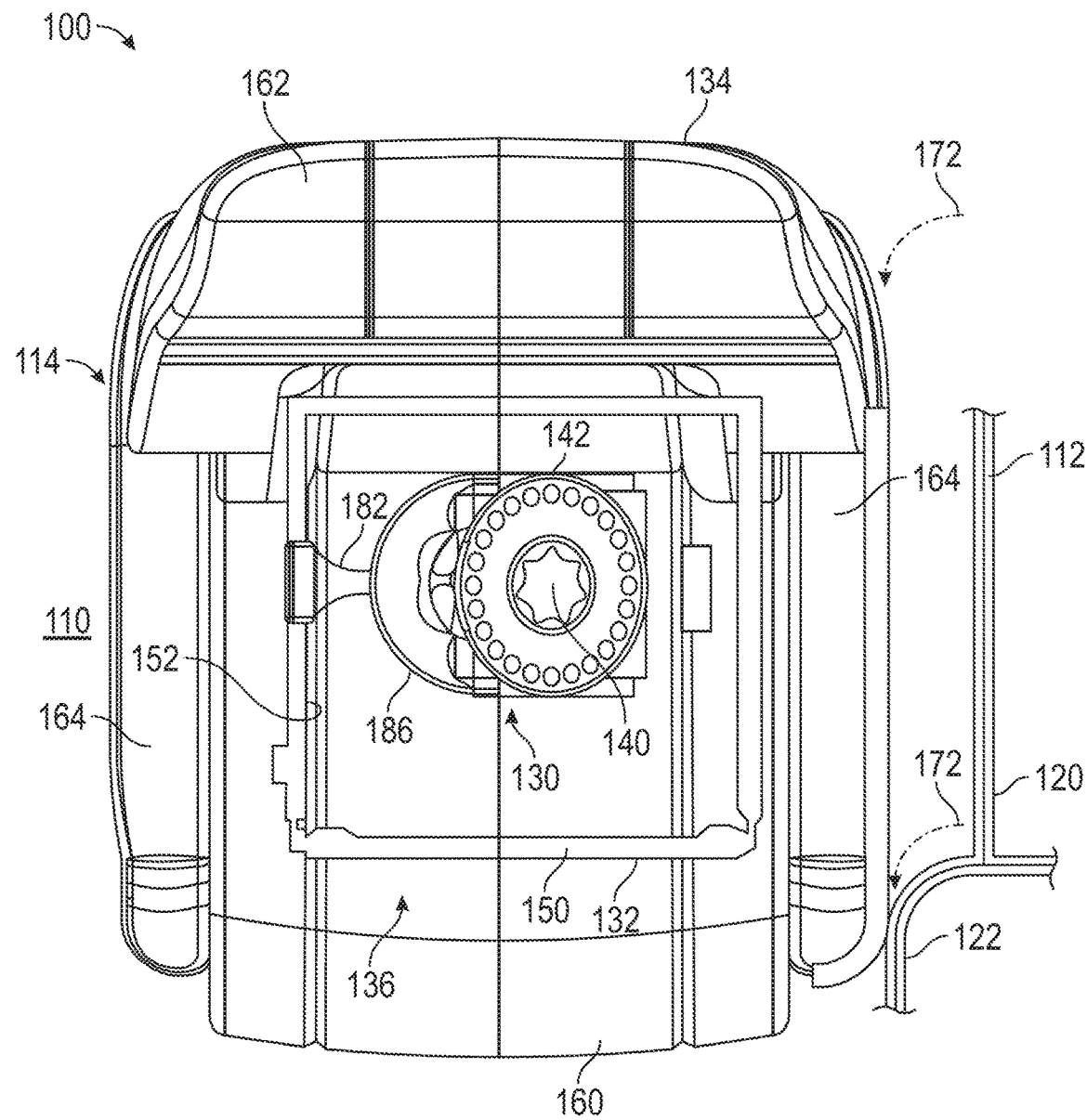
Figure 1C:
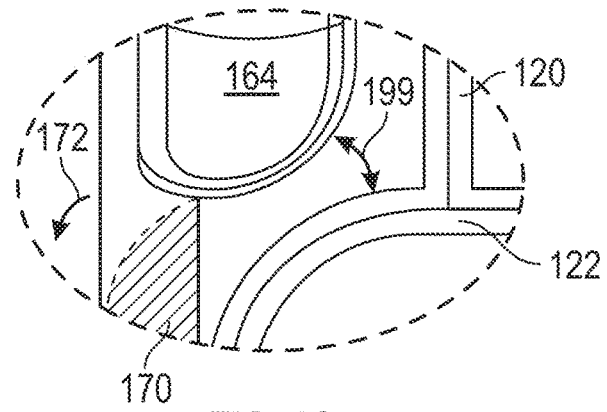
FIG. 1C is an expanded view illustrating a portion of FIG. 1A.

Referring now to FIGS. 1A-C, an aircraft interior 100 is illustrated in top views in accordance with the teachings of the present disclosure. Aircraft interior 100 includes a floor 110, an obstacle 112, and a seat assembly 114. In the example provided, aircraft interior 100 is a cabin of a jet airplane. Components of aircraft interior 100 may be located in any other type of vehicle, machinery, or sitting space, including, but not limited to, helicopters, propeller operated planes, submarines, movie theaters, air ships, lounges, and other locations without departing from the scope of the present disclosure.

Floor 110 supports seat assembly 114. In the example provided, floor 110 is mounted within the fuselage of the aircraft and includes floor rails (not illustrated) for mounting seat assembly 114, as will be appreciated by those with ordinary skill in the art.

In the example provided, obstacle 112 is a side ledge of an aircraft cabin. It should be appreciated that obstacle 112 may be any physical object in a substantially stationary location near seat assembly without departing from the scope of the present disclosure. For example, obstacle 112 may be a table, another seat, a bulkhead, and other physical objects. Obstacle 112 includes a shallow ledge portion 120 and a deep ledge portion 122. Shallow ledge portion 120 is disposed to the side of seat assembly 114, and deep ledge portion 122 is disposed at least partially directly in front of seat assembly 114. Because conventional seat assemblies do not limit translation of the seat in the forward direction towards deep ledge portion 122, such conventional seat assemblies may permit arm rest collision with side ledge obstacle 112.

Figure 2:
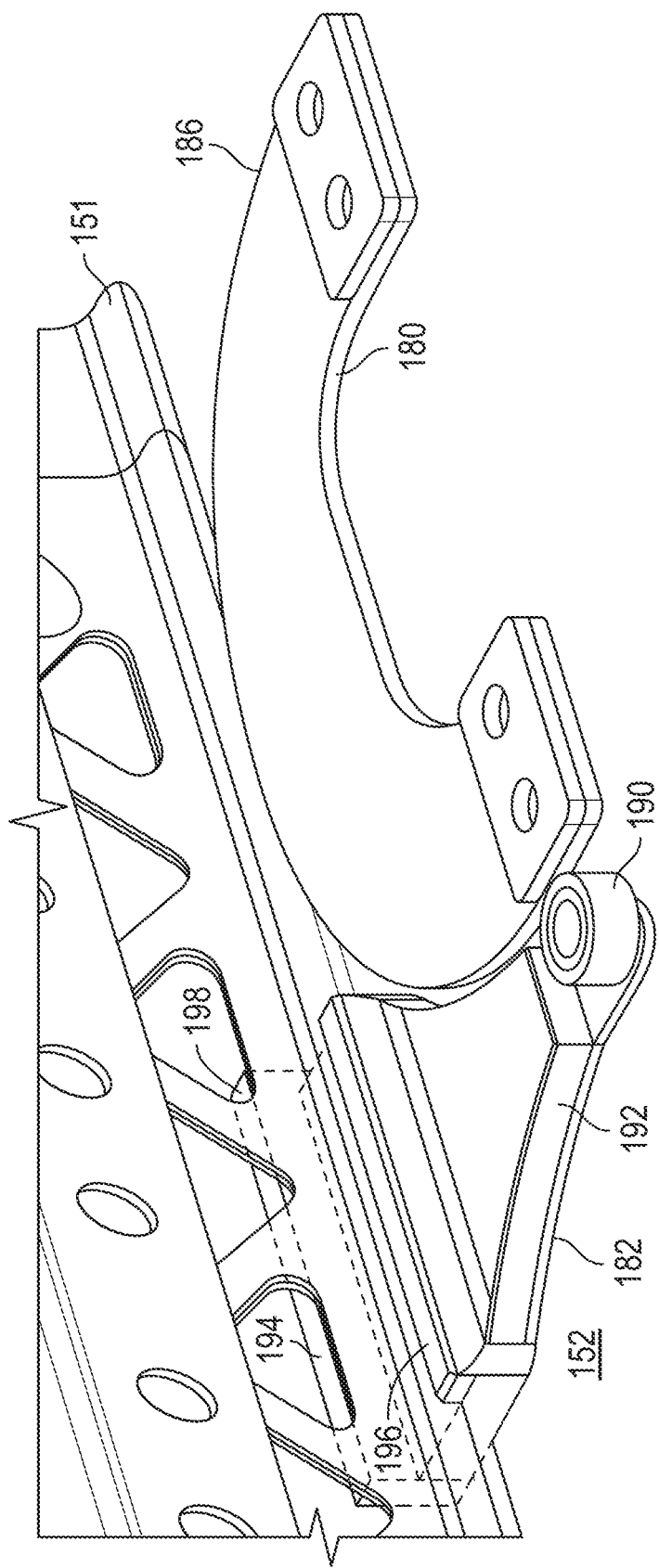
FIG. 2 is a simplified view illustrating a non-limiting embodiment of a seat maze assembly of the aircraft interior of FIGS. 1A-B in accordance with teachings of the present disclosure.
Figure 3:
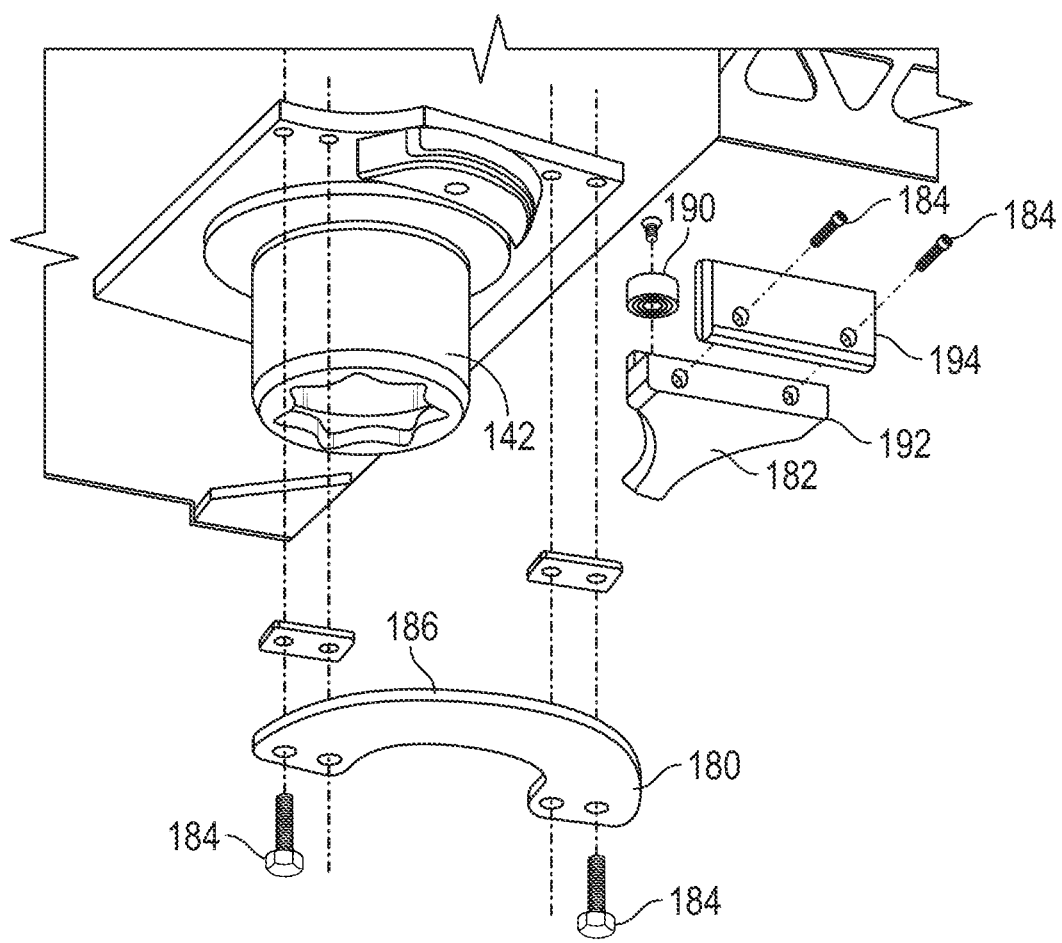
FIG. 3 is an exploded view of portions of the aircraft interior of FIGS. 1A-B.

Referring now to FIGS. 2-3, and with continuing reference to FIGS. 1A-B, additional components of seat assembly 114 are illustrated. Seat assembly 114 includes a seat base 130, a seat frame 132, a seat body 134, and a seat maze assembly 136.

Seat base 130 includes a floor mounted component 140 and a swivel box 142. Floor mounted component 140 is fixed to floor 110 such that floor mounted component remains stationary with respect to floor 110. For example, floor mounted component 140 may be fixed to C-channel tracks (not illustrated) within floor 110 to fix floor mounted component 140 to floor 110, as will be appreciated by those with ordinary skill in the art.

Seat base 130 selectively secures seat frame 132 to floor 110 with use of a conventional user operated locking mechanism (not illustrated). When seat frame 132 is secured to floor 110, the locking mechanism restricts movement of seat frame 132 relative to seat base 130. Accordingly, seat frame 132 is immovably secured to floor 110 when the locking mechanism is engaged. When seat frame 132 is not secured to seat base 130, seat frame 132 is able to freely translate and swivel around seat base 130 within limits defined by seat frame 132 and seat maze assembly 136, as will be described below.

In the example provided, seat base 130 utilizes a scepter gear to facilitate rotation of swivel box 142 about floor mounted component 140. Tracking tubes facilitate translation of seat frame 132 relative to seat base 130, as will be appreciated by those with ordinary skill in the art. Multiple variations on movement and locking mechanisms are known to those of ordinary skill in the art, and exhaustive details are not further described herein.

Seat frame 132 is selectively secured to seat base 130 and includes a frame rail 150. As used herein, the term "selectively secured" refers to the ability of the seat frame 132 to be locked stationary with respect to seat base 130 or to be released from seat base 130 by use of the locking mechanism.

Seat frame 132 is a structural assembly that supports seat body 134 and a person seated in seat body 134. Frame rail 150 is substantially parallel with floor 110 and has a rail flange 151 parallel to and opposing floor 110. Frame rail 150 circumscribes seat base 130 to define a bounding area 152 in which seat base 130 may translate relative to the seat frame. As used herein, the term "circumscribe" means to draw a line around or to surround as a boundary in accordance with common usage. Because seat base 130 is mounted to floor 110, seat frame 132 may be considered to move with respect to seat base 130 as long as seat frame 132 is not urged to travel beyond a distance where seat base 130 contacts frame rail 150 at an edge of bounding area 152. For example, a seat occupant may release the locking mechanism and apply a translation force to seat body 134 in a forward direction, a backward direction, a left direction, a right direction, or in a combination of directions. The translation force urges seat body 134 to move, which in turn urges seat frame 132 to move.

In the example provided, seat frame 132 translates on a plane that is substantially parallel with floor 110. Seat frame 132 may translate freely along the longitudinal and lateral directions of the aircraft while seat frame 132 is positioned such that seat base 130 is not in contact with frame rail 150 and while seat maze assembly 136 is not restricting movement. When frame rail 150 contacts seat base 130, seat base 130 transfers the translation force to floor 110 and further movement of seat frame 132 is restricted by interference of seat base 130 with frame rail 150.

Seat body 134 is secured to seat frame 132 and provides surfaces that support a seated occupant of seat assembly 114. Seat body 134 includes a seat portion 160, a backrest portion 162, and an armrest portion 164. The seat occupant sits on seat portion 160 facing away from backrest portion 162.

Seat maze assembly 136 is configured to extend a perimeter of seat base 130 to obstruct movement of seat frame 132 and seat body 134 in a clearance area 170, as is best seen in the expanded portion of FIG. 1A. Clearance area 170 is an area where seat base 130 is still within bounding area 152, but seat maze assembly 136 has restricted movement of seat frame 132 and seat body 134. For example, seat maze assembly 136 may be positioned to minimize a risk of pinching fingers where normal free translation of seat frame 132 may result in compression of a seat occupant's hand between armrest portion 164 of seat body 134 and deep ledge portion 122 of side ledge obstacle 112. Seat maze assembly 136 guides armrest portion 164 around deep ledge portion 122 along a path 172 determined by seat maze assembly 136.

Seat maze assembly 136 includes a guide plate 180, a bearing block 182, and fasteners 184. Guide plate 180 is fixed to swivel box 142 of seat base 130 and is disposed at least partially in bounding area 152. Guide plate 180 defines a guide surface 186 opposing bearing block 182 beyond an outer perimeter of swivel box 142. In other words, guide plate 180 extends an outer effective perimeter of swivel box 142 such that the outer effective perimeter reduces the bounding area 152 by the clearance area 170. For example, instead of interaction between frame rail 150 and swivel box 142 to limiting relative movement, guide plate 180 contacts bearing block 182 as an extension of the outer dimensions of swivel box 142. Guide surface 186 at least partially defines a shape of clearance area 170. In the example provided, the boundary of clearance area 170 has the same shape as guide surface 186.

Bearing block 182 is fixed to frame rail 150 opposing guide plate 180 and extending into bounding area 152. Bearing block 182 includes a bearing member 190, an interior member 192, and an exterior member 194, which are shown in an exploded view in FIG. 3.

Bearing member 190 is configured to engage with guide plate 180 to urge seat frame 132 around clearance area 170. In the example provided, bearing member 190 is substantially cylindrical in shape and has an axis of rotation that is substantially perpendicular to a plane of translation of seat frame 132. Accordingly, bearing member 190 rolls against guide surface 186 to urge seat frame 132 away from clearance area 170. In some embodiments, bearing member 190 is omitted and bearing block 182 slides against guide surface 186.

Interior member 192 extends into bounding area 152 and includes an interior flange 196 at a top portion of interior member and opposing frame rail 150. Exterior member 194 opposes interior member 192 across rail flange 151 and includes an exterior flange 198 opposing interior flange 196. Interior member 192 secures to exterior member 194 with fasteners 184 to engage rail flange 151. Interior flange 196 and exterior flange 198 engage a top of rail flange 151 and members 192 and 194 compress rail flange 151 to immovably mount bearing block 182 to rail flange 151.

Guide plate 180 and bearing block 182 cooperate to define clearance area 170. For example, when a seat occupant releases seat frame 132 from seat base 130 and urges seat body 134 towards deep ledge portion 122 of obstacle 112, guide surface 186 urges bearing member 190 to cause seat body 134 to travel path 172 outside of clearance area 170. Clearance area 170 maintains a predetermined clearance 199 between armrest portion 164 of seat assembly 114 and deep ledge portion 122 of obstacle 112. In the example provided, predetermined clearance 199 is based on statistical averages of human finger dimensions.

It should be appreciated that the actual dimensions and shapes of bearing block 182 and guide plate 180 will vary by implementation without departing from the scope of the present disclosure. For example, a length of interior member 192 or a width of guide plate 180 may be shortened to reduce predetermined clearance 199. Similarly, the shape of guide surface 186 may be altered to change the shape of travel path 172.

The embodiments described herein promote free translation and rotation of a seat body while restricting movement of the seat body in a location that may result in contact with an obstacle.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft interior, comprising:
   a floor;
   a seat base fixed to the floor;
   a seat frame selectively fixed to the seat base and including a frame rail circumscribing the seat base to define a bounding area in which the seat base may translate freely in longitudinal and lateral directions of the aircraft relative to the seat frame;
   a seat body mounted on the seat frame and including an arm portion;
   an obstacle separate from the seat base, separate from the seat frame, and proximate the arm portion of the seat body at an obstacle location; and
   a seat maze configured to guide the seat frame around a clearance area within the bounding area to restrict free translation of the seat base to maintain a predetermined clearance between the arm portion and the obstacle, the seat maze comprising:
   a guide plate fixed to the seat base and disposed at least partially in the bounding area at a fixed location relative to the obstacle;
   a bearing block fixed to the frame rail opposing the guide plate and extending into the bounding area, the bearing block comprising:
   an interior member disposed inside the frame rail;
   an exterior member opposing the interior member across the frame rail; and
   a fastener configured to compress the interior member and the exterior member and to mount the bearing block to the seat frame at varying locations on the frame rail, wherein the bearing block is fixed on the frame rail at a location that is based on the obstacle location,
   wherein the guide plate and the bearing block cooperate to define the clearance area.

2. The aircraft interior of claim 1, wherein the bearing block includes a bearing member configured to engage with the guide plate to urge the seat frame around the clearance area.

3. The aircraft interior of claim 2, wherein the bearing member is substantially cylindrical in shape and has an axis of rotation that is substantially perpendicular to a plane of translation of the seat frame.

4. The aircraft interior of claim 2, wherein the guide plate defines a guide surface opposing the bearing block, and wherein the guide surface defines a shape of the clearance area.

5. The aircraft interior of claim 4, further comprising a swivel box translationally fixed to the seat base.

6. The aircraft interior of claim 5, wherein the guide plate is fixed to the swivel box.

7. The aircraft interior of claim 4, wherein the frame rail includes a rail flange, and wherein the bearing member mounts to the rail flange.

8. The aircraft interior of claim 7, wherein the interior member secures to the exterior member to engage the rail flange.

9. The aircraft interior of claim 4, wherein the obstacle is a side ledge.

* * * * *